United States Patent
Kondo et al.

(10) Patent No.: US 10,357,926 B2
(45) Date of Patent: Jul. 23, 2019

(54) METAL/CFRP COMPOSITE STRUCTURE, AND ITS MANUFACTURING METHOD AND APPARATUS

(71) Applicant: AISIN TAKAOKA CO., LTD., Toyota-shi, Aichi (JP)

(72) Inventors: Kiyohito Kondo, Toyota (JP); Yuji Yamashita, Toyota (JP)

(73) Assignee: AISIN TAKAOKA CO., LTD., Toyota-Shi, Aichi (JP)

( * ) Notice: Subject to any disclaimer, the term of this patent is extended or adjusted under 35 U.S.C. 154(b) by 85 days.

(21) Appl. No.: 14/443,812

(22) PCT Filed: Nov. 18, 2013

(86) PCT No.: PCT/IB2013/060205
§ 371 (c)(1),
(2) Date: May 19, 2015

(87) PCT Pub. No.: WO2014/076673
PCT Pub. Date: May 22, 2014

(65) Prior Publication Data
US 2015/0298404 A1    Oct. 22, 2015

(30) Foreign Application Priority Data
Nov. 19, 2012    (JP) .................. 2012-253228

(51) Int. Cl.
*B29C 70/68*    (2006.01)
*B29C 70/78*    (2006.01)
(Continued)

(52) U.S. Cl.
CPC .............. *B29C 70/78* (2013.01); *B29C 35/02* (2013.01); *B29C 70/46* (2013.01); *B29C 70/683* (2013.01);
(Continued)

(58) Field of Classification Search
CPC . B29C 70/683; B29C 65/44; B29C 66/72141; B29C 66/742–74285;
(Continued)

(56) References Cited

U.S. PATENT DOCUMENTS 3,214,792 A    11/1965   Fassina
3,668,917 A *   6/1972   Komatsu .................... B21J 5/00
                                                                148/580
(Continued)

FOREIGN PATENT DOCUMENTS

CN          1895877 A      1/2007
CN      102 094 158 A      6/2011
(Continued)

OTHER PUBLICATIONS

Machine translation of German Patent Publication No. DE-102006058601A1, originally published Jun. 2008, 8 pages (Year: 2008).*

(Continued)

*Primary Examiner* — William P Bell
(74) *Attorney, Agent, or Firm* — Buchanan Ingersoll & Rooney PC

(57) ABSTRACT

Provided are a metal/CFRP composite structure which has lightweight and high strength by combining hot-pressed metal material(s) and carbon fiber reinforced plastic (CFRP) material(s), and its manufacturing method and apparatus. A metal blank material is heated to a temperature at which quenching is possible to obtain a first intermediate product quenched by hot-pressing. The first intermediate product, and a carbon fiber reinforced plastic (CFRP) prepreg comprising carbon fiber and uncured thermoset plastic are set into CFRP forming dies followed by press-forming the prepreg to obtain a secondary intermediate product having the CFRP in intimate contact with a surface of the first (Continued)

intermediate product. The CFRP and the first intermediate product are firmly adhered together by thermal curing of thermoset plastic located in the boundary of the CFRP and the first intermediate product, by subjecting the thermoset plastic contained in the CFRP prepreg to thermal curing.

9 Claims, 4 Drawing Sheets

(51) Int. Cl.
    *B29C 70/46*     (2006.01)
    *B29C 35/02*     (2006.01)
    *B32B 15/08*     (2006.01)
    *B32B 37/06*     (2006.01)
    *B32B 37/10*     (2006.01)
    *B32B 37/24*     (2006.01)
    *B29L 9/00*     (2006.01)
    *B29L 31/30*     (2006.01)

(52) U.S. Cl.
    CPC .............. *B32B 15/08* (2013.01); *B32B 37/06* (2013.01); *B32B 37/10* (2013.01); *B32B 37/24* (2013.01); *B29L 2009/003* (2013.01); *B29L 2031/3055* (2013.01); *B32B 2250/02* (2013.01); *B32B 2262/106* (2013.01); *B32B 2605/08* (2013.01)

(58) Field of Classification Search
    CPC . B29C 65/46; B29C 70/68–865; B29C 70/84; B32B 19/092; Y02P 10/265; B21K 29/00
    See application file for complete search history.

(56) References Cited

U.S. PATENT DOCUMENTS 4,559,974 A * 12/1985 Fawley ................... B29C 53/66
                                            138/172

6,468,613 B1    10/2002   Kitano et al.
2010/0034997 A1*  2/2010   Buchanan ............... B32B 5/147
                                                428/34.1

FOREIGN PATENT DOCUMENTS

| DE | 102006058601 A1 * | 6/2008 | ........... B29C 65/028 |
|---|---|---|---|
| JP | 3-51064 A | 3/1991 | |
| JP | 06-101732 A | 4/1994 | |
| JP | 06144123 A | 5/1994 | |
| JP | 9-215780 A | 8/1997 | |
| JP | 2000-061005 A | 2/2000 | |
| WO | WO 99/10168 A1 | 3/1994 | |
| WO | WO 2009014486 A1 * | 1/2009 | ............. B29C 7/088 |
| WO | 2012073775 A | 6/2012 | |

OTHER PUBLICATIONS

Office Action (Notification of the First Office Action) dated Mar. 31, 2016, by the State Intellectual Property Office of the Peoples Republic of China in corresponding Chinese Patent Application No. 201380060130.8 and an English translation of the Office Action. (19 pgs).

International Search Report (PCT/ISA/210) dated Mar. 4, 2014, by the Japanese Patent Office as the International Searching Authority for International Application No. PCT/IB2013/060205.

Written Opinion (PCT/ISA/237) dated Mar. 4, 2014, by the Japanese Patent Office as the International Searching Authority for International Application No. PCT/IB2013/060205.

International Preliminary Report on Patentability (PCT/IPEA/409) dated Feb. 24, 2015, by the Japanese Patent Office as the International Preliminary Examining Authority for International Application No. PCT/IB2013/060205.

Written Opinion (PCT/IPEA/408) dated Nov. 4, 2014, by the Japanese Patent Office as the International Preliminary Examining Authority for International Application No. PCT/IB2013/060205.

Office Action dated Jun. 26, 2014, by the Japanese Patent Office for Application No. 2012-253228.

* cited by examiner

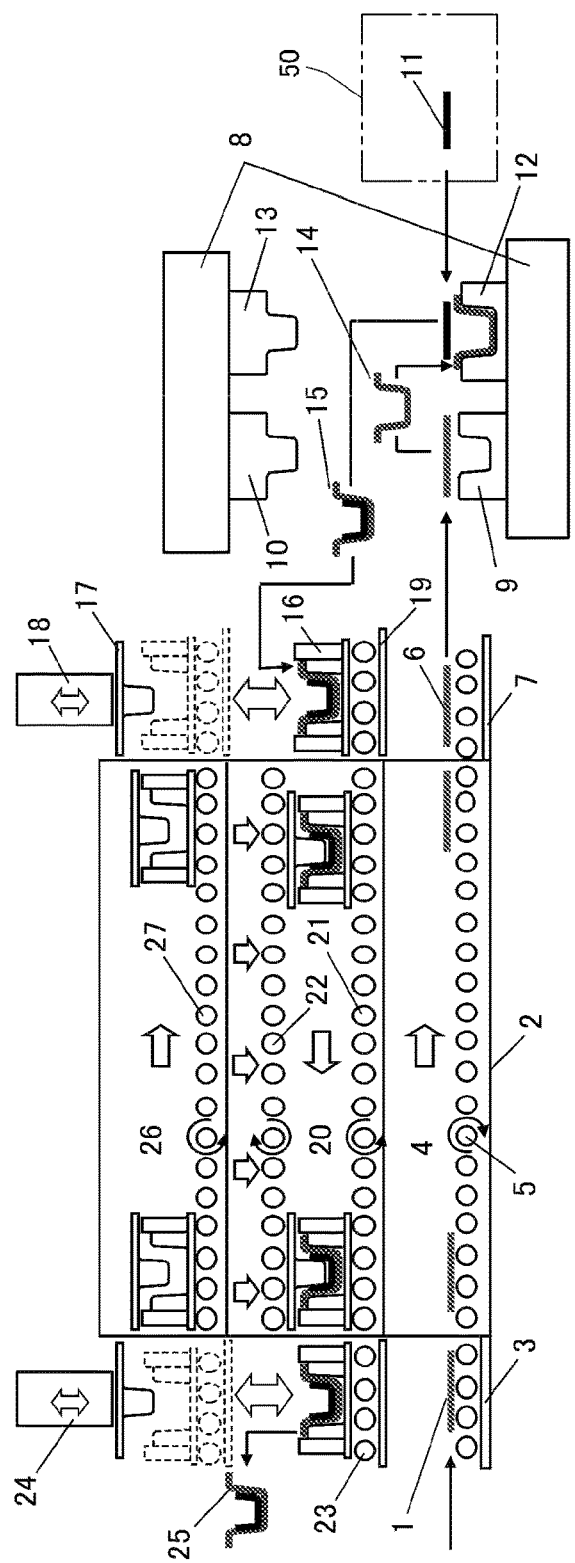
[Fig. 1]

[Fig. 2]
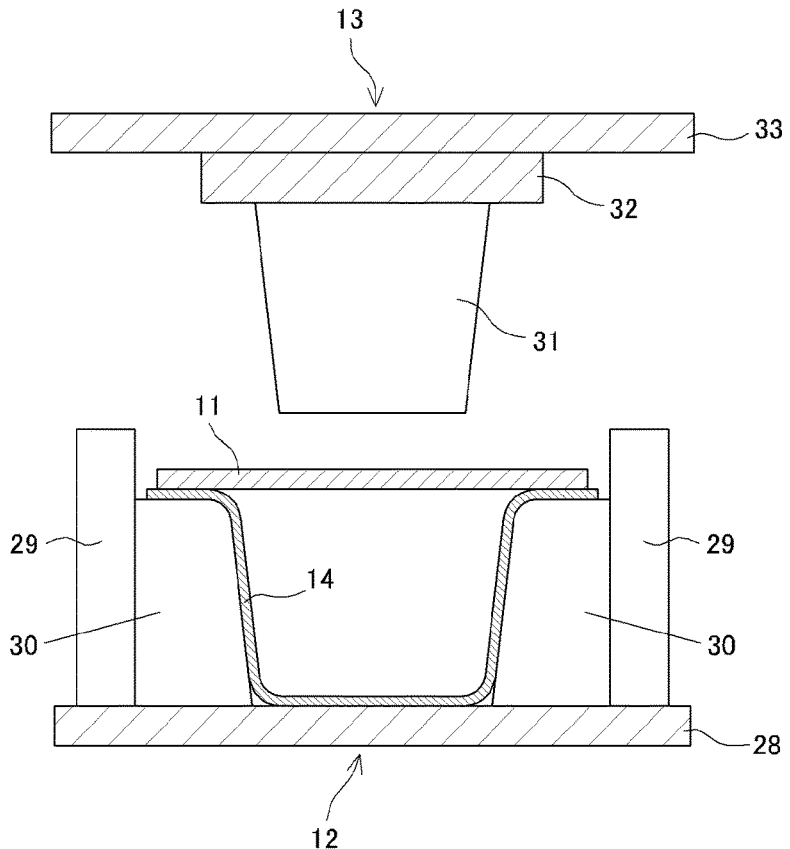
[Fig. 3]
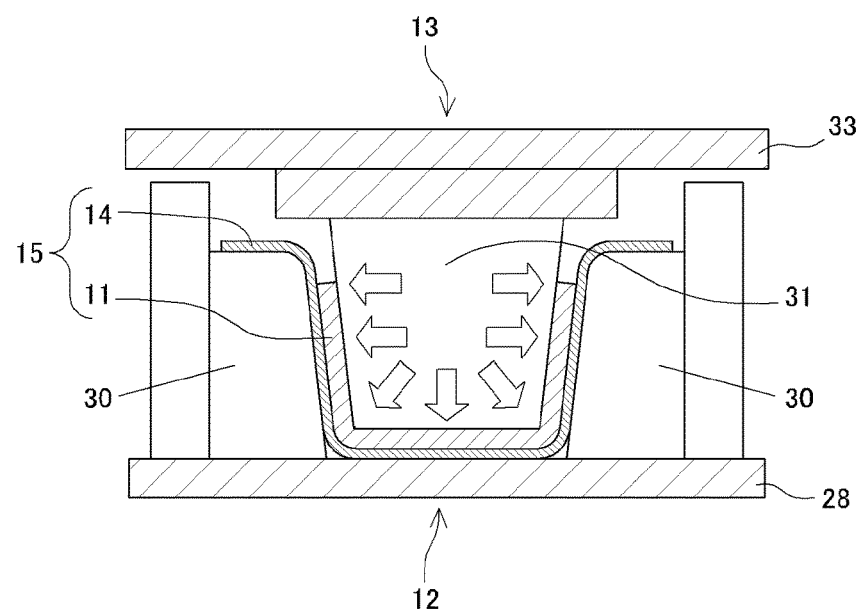

[Fig. 4]
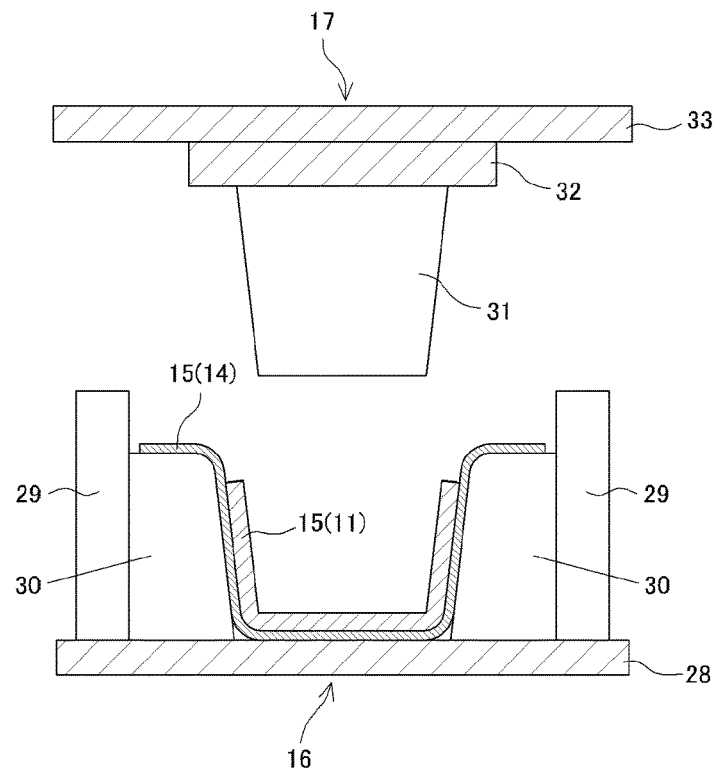
[Fig. 5]
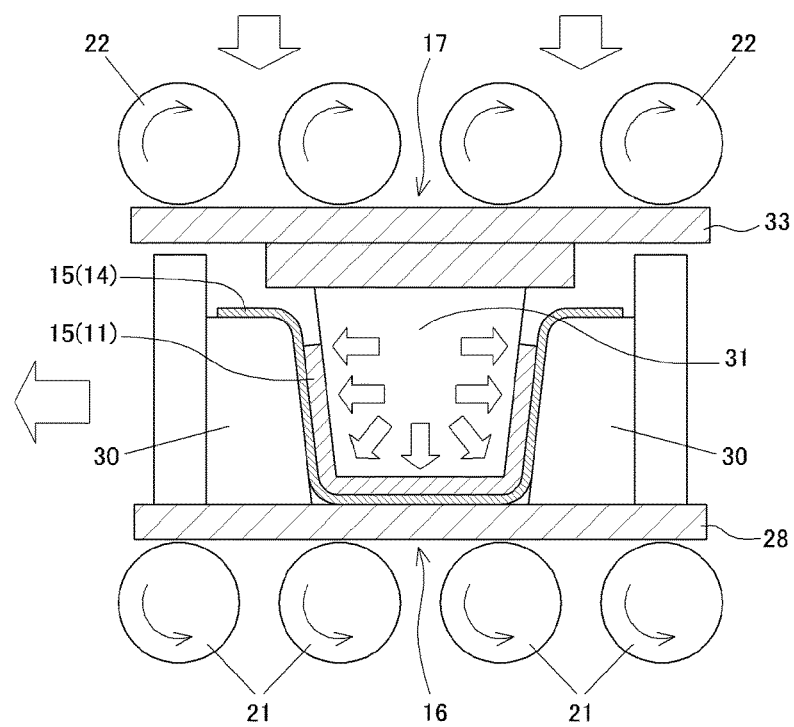

[Fig. 6]
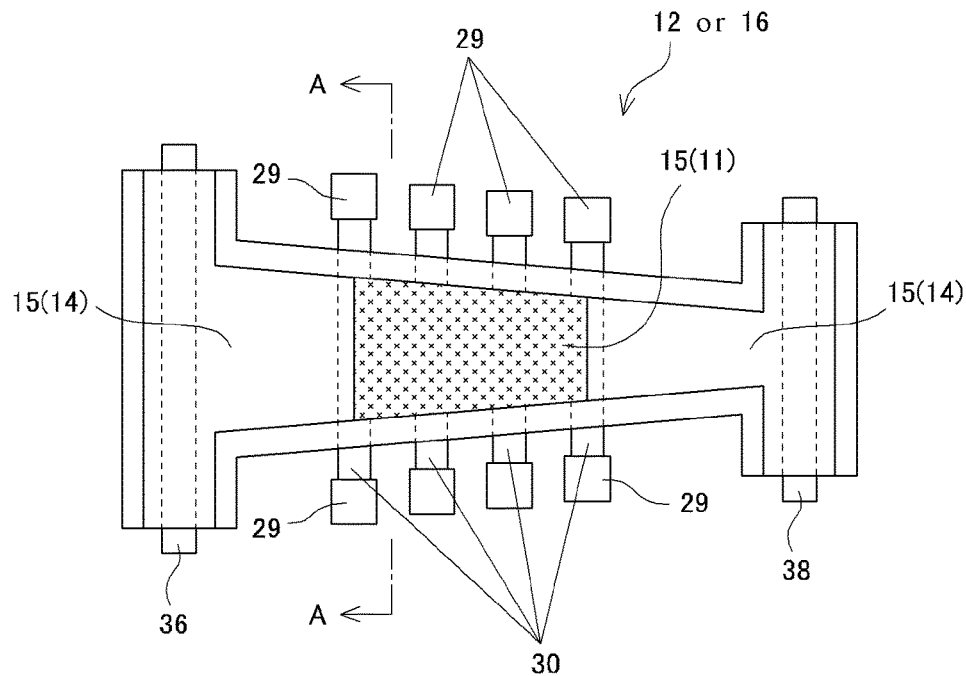
[Fig. 7]
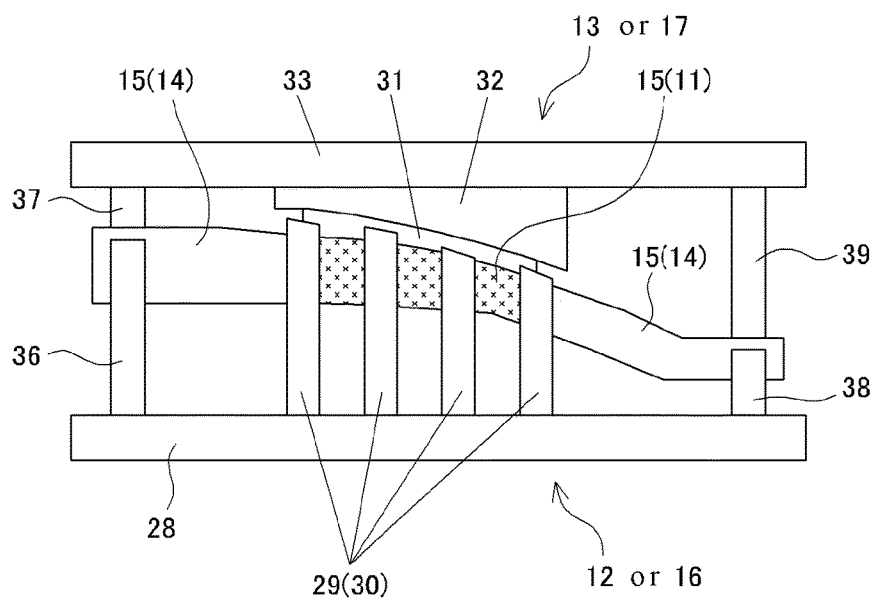

METAL/CFRP COMPOSITE STRUCTURE, AND ITS MANUFACTURING METHOD AND APPARATUS

CROSS-REFERENCE TO RELATED APPLICATIONS

The present application claims priority based on JP Patent Application 2012-253228 filed in Japan on Nov. 19, 2012, whose entire disclosure is incorporated herein by reference thereto. The present invention relates to a metal/CFRP composite structure comprising a combination of metal material and carbon fiber reinforced plastic (CFRP) material, and a manufacturing method and a manufacturing apparatus thereof.

TECHNICAL FIELD

Background

Weight saving is requested for automobile parts from a viewpoint of an improvement in fuel consumption and environmental protection, and it is a common practice to deal with weight saving of parts (thinning of thickness of a board) and reinforcing the strength of parts at the same time by hot-pressing (it is also called "die quenching" because press-forming (press-molding) and quenching are performed simultaneously) of a steel plate. For further weight saving and reinforcing the strength of parts, it is a leading choice to replace with a light-weighted and high strength material(s) rather than steel plate (steel material), and an application of aluminum, a composite material combined of fiber and plastic is also considered. Especially, the carbon fiber reinforced plastic (CFRP) is the light-weighted and high strength material, and it is expected to apply the material to a car body (chassis) and a part(s) thereof in the future. However, as to CFRP, its cost of material(s) is expensive at present, and it is problematic that a cycle time at the time of forming parts takes long time (as a result, a manufacturing cost is expensive).

Disclosed in Patent Literature 1 (JP06-101732A) is "a material for impact absorption of the composite structure", in which an aluminium alloy (shock absorber) and a fiber-reinforced plastic (lightweight and high strength material) are adhered (bonded) with bolts. However, the technique of Patent Literature 1 is an example of a base material made from an aluminium alloy.

Disclosed in Patent Literature 2 (WO99/10168A) is a structural material (light metal/structural member made of CFRP) which adhered (bonded) a carbon fiber reinforced resin (CFRP) material on a surface of a light metal material through an adhesive layer between both materials. However, the light metal disclosed in Patent Literature 2 is mainly aluminum.

PATENT LITERATURE (PTL)

[PTL 1]
JP06-101732A (Paragraphs 0017-0022, etc)
[PTL 2]
WO99/10168A (Toray Industries, Inc.)

SUMMARY

It is deemed that entire disclosure of each Patent Literature in the above is incorporated herein by reference.
The following analysis is given by the present invention.

In Patent Literature 1, a forming (molding) step of the aluminum base material, a forming step of the fiber-reinforced plastic as the lightweight material having high strength, and an adhering step of the aluminum base material and the fiber-reinforced plastic after forming are mutually separate independent steps, and a manufacturing cost was expensive because of a necessity of taking many steps. Furthermore, since connection of the aluminum base material to the fiber-reinforced plastic is a connection via bolts, i.e., point connection, it cannot be denied that the strength and rigidity of the composite structure are inferior compared with the case where the whole surface is adhered (surface adhering structure).

In Patent Literature 2, a forming step of the light metal, a forming step of CFRP comprising carbon fiber and plastic (thermoset resin or thermoplastic resin), and an adhering step of the light metal and CFRP after forming are mutually separate independent steps, and a manufacturing cost was expensive because of a necessity of taking many steps. Furthermore, since adhesive(s) is needed additional to CFRP, its cost of material(s) and working cost of adhesive application and bonding together are needed, and this point also causes an increase in cost. Moreover, in the example of Patent Literature 2, a curing type (at room temperature) adhesive is used as adhesive, and there is a tendency that a cycle time of the manufacturing process also becomes long because of requiring the curing time of adhesives.

It is an object of the present invention to provide a metal/CFRP composite structure which has lightweight and high strength by combining hot-pressed metal material and carbon fiber reinforced plastic (CFRP) material, and a manufacturing method of the metal/CFRP composite structure in which such metal/CFRP composite structure can be manufactured at low consumption of energy and low cost, and a manufacturing apparatus of the metal/CFRP composite structure suitable for carrying out the manufacturing method.

The present application comprises inventions from three aspects of manufacturing method, product and manufacturing apparatus.

<Manufacturing Method of Metal/CFRP Composite Structure>

In a first aspect, there is provided a manufacturing method of metal/CFRP composite structure. The manufacturing method comprises:

heating a metal blank material to a temperature at which quenching is possible;

hot-pressing the blank material to obtain a first intermediate product which is quenched by the hot-pressing; and a preparation to prepare a carbon fiber reinforced plastic (CFRP) prepreg formed of carbon fiber and uncured thermoset plastic.

The method further comprises:

CFRP forming in which the CFRP prepreg is press-formed to obtain a secondary intermediate product having the CFRP prepreg in intimate contact with a surface of the first intermediate product by setting the hot-pressed first intermediate product and the CFRP prepreg into CFRP forming dies, followed by press-forming; and thermal curing bonding which bonds the CFRP prepreg and the first intermediate product firmly by thermal curing of the thermoset plastic located in a boundary of the CFRP prepreg and the first intermediate product while thermally curing the thermoset plastic contained in the CFRP prepreg by keeping warm and pressurizing the secondary intermediate product obtained by the CFRP forming for a predetermined period of time.

More preferably, the metal is iron-based metal. More preferably, the forming (molding) of the CFRP prepreg is performed such that the CFRP prepreg is overlapped on the hot-pressed first intermediate product, and subsequently, the CFRP prepreg is pressed or formed complementary with a shape of the first intermediate product which have been hot-pressed and quenched.

According to the manufacturing method, since the remaining heat in the hot-pressing (die quenching) is used effectively to enable to form the CFRP prepreg, a reduction of manufacturing cost and energy saving can be attained. Since the CFRP forming and the thermal curing adhesion can be carried out by the superposition of the first intermediate product and the CFRP prepreg, a structure of the CFRP forming dies and holding molds for curing/adhering can be simplified, and a manufacturing cost can be reduced.

<Iron-Based Metal/CFRP Composite Structure>

In a second aspect, there is provided an iron-based metal/CFRP composite structure.

The composite structure comprises:

a quenched metal base body obtainable by hot-pressing an iron-based metallic blank material; and a carbon fiber reinforced plastic (CFRP) intimately placed onto at least a part of a surface of the metal base structure.

The carbon fiber reinforced plastic comprises carbon fiber and a thermoset plastic. The metal base body and the carbon fiber reinforced plastic are firmly bound by thermal curing of a portion of the thermoset plastic located in a boundary of the metal base body and the carbon fiber reinforced plastic, the portion being provided from the carbon fiber reinforced plastic.

The CFRP prepreg has a shape complementary with a shape of the quenched metal base body.

According to the composite structure, the lightweight and high strength component(s) or part(s) (composite structure) can be manufactured comparatively at low cost by combining the quenched metal base body obtainable by hot-pressing and the carbon fiber reinforced plastic (CFRP). Moreover, since the amount of CFRP used can be reduced to a necessary minimum amount, it is easy to realize a low cost.

<Manufacturing Apparatus of Metal/CFRP Composite Structure>

In a third aspect, there is provided a manufacturing apparatus of metal/CFRP composite structure.

The manufacturing apparatus comprises:

a heating housing and a pressing machine;

the heating housing comprises a first heating chamber for heating a metal blank material to a temperature at which quenching is possible and a second heating chamber.

The pressing machine comprises:

a hot-press for obtaining a first intermediate product by hot-pressing the blank material; and a CFRP forming (molding) unit that press-forms a CFRP prepreg to obtain a secondary intermediate product in which the CFRP prepreg is in intimate contact with a surface of the first intermediate product, by setting the hot-pressed first intermediate product and the CFRP prepreg comprising carbon fiber and uncured thermoset plastic into CFRP forming dies.

The second heating chamber is adapted for bonding the CFRP prepreg and the first intermediate product firmly by thermal curing of a portion of the thermoset plastic located in the boundary of the CFRP prepreg and the first intermediate product while subjecting the thermoset plastic contained in the CFRP prepreg to thermal curing by keeping warm and pressurizing the secondary intermediate product while being kept in a holding mold for curing/adhering for a predetermined period of time.

The second heating chamber is disposed directly above the first heating chamber, adapted to receive remaining heat from the first heating chamber as a heat source.

In the manufacturing apparatus of metal/CFRP composite structure, it is preferred that the heating housing further comprises a third heating chamber for preheating the holding mold(s) for curing/adhering before holding the secondary intermediate product, the third heating chamber being disposed directly above the second heating chamber, adapted to receive remaining heat from the first and second heating chambers as a heat source.

The holding mold(s) for curing/adhering is prepared in a plurality of pairs.

The heating housing further comprises a conveying system for conveying cyclically the plural pairs of holding molds within the second and third heating chambers.

According to the manufacturing apparatus, since the second heating chamber being disposed directly above the first heating chamber, adapted to receive remaining heat from the first heating chamber as a heat source, energy saving and reduction of the manufacturing cost can be attained, as well as reducing the cost of equipment for curing/adhering of the secondary intermediate product. In addition, since many works (secondary intermediate product) can be simultaneously processed with a plurality of pairs of holding molds (or dies) for curing/adhering, a cycle time per product can be shortened in a total, and high productivity can be realized, even when a long time is required for thermal curing of thermoset plastic.

Advantageous effects of Invention are mentioned below without limitation.

According to first to third aspects, the metal/CFRP composite structure which has lightweight and high strength can be provided by combining hot-pressed metal material(s) and carbon fiber reinforced plastic (CFRP) material(s). In addition, according to the manufacturing method and the manufacturing apparatus, the metal/CFRP composite structure which has lightweight and high strength can be manufactured at low consumption energy and low cost.

BRIEF DESCRIPTION OF DRAWINGS

FIG. 1 is a schematic diagram of an example of manufacturing apparatus of a metal/CFRP composite structure;

FIG. 2 is a schematic sectional view of CFRP forming dies where the dies are opened;

FIG. 3 is a schematic sectional view of CFRP forming dies where the dies are closed;

FIG. 4 is a schematic sectional view of the holding molds for curing/adhering where the holding molds are opened;

FIG. 5 is a schematic sectional view of the holding molds for curing/adhering where the hold molds are closed and conveyed;

FIG. 6 is a plan view of a bottom mold of the CFRP forming die and the holding mold for curing/adhering;

FIG. 7 is a full side view of the CFRP forming die and the holding mold for curing/adhering.

PREFERRED MODES

In the following, exemplary embodiments and preferable alternative embodiments of the present invention with reference to Drawings are explained.

FIG. 1 shows a manufacturing apparatus of a metal/CFRP composite structure suitable according to an exemplary embodiment of the present disclosure. This manufacturing apparatus provides a heating housing 2 depicted in left side of FIG. 1 and a pressing machine 8 depicted in right side of FIG. 1. Especially, the heating housing 2 has a three-story (floor) structure (multi-stage structure), and a first heating chamber 4 placed in the first floor (stage) part (bottom layer), a second heating chamber 20 placed in the second floor (stage) part (middle layer) and a third heating chamber 26 placed in the third floor (stage) part (top layer). Other appended facilities of the heating housing 2 will be explained later. Die quenching (DQ) forming dies (9, 10) and CFRP forming dies (12, 13) are provided together in a pressing machine 8

In the present exemplary embodiment, as a starting material, a plate-like metal blank material 1 and a sheet-like carbon fiber reinforced plastic (CFRP) prepreg 11 are used.

The blank material 1 is a blank material made of a metal plate material in which quenching is possible, for example, such that a high-tensile steel sheet (thickness: 1 to 3 mm) is blanked, with the pressing machine for blanking, to be in a predetermined planary form, and processed to be a shape of a plate. Generally, the high-tensile steel means a tough steel which realizes a tensile strength of about 400 to 1200 MPa (Mega pascal) by adding a little alloying elements to low carbon steel, and is an iron-based metal for which quenching is possible from temperatures of austenite range. In the present exemplary embodiment, a high-tensile steel sheet having a thickness of about 2 mm and a tensile strength of 500 to 1000 MPa is used as the blank material 1. Moreover, a steel plate in which aluminum plating or Zn plating was applied was used for the blank material 1 so that oxidation scale would not generate on the blank material surface at the time of high temperature heating in the first heating chamber 4.

On the other hand, a CFRP prepreg 11 is ones in which carbon fiber is impregnated with an uncured thermoset plastic (for example, epoxy resin), and this can be obtained by adding some treatments to a commercial prepreg(s). That is, while many CFRP prepregs available in the market generally have a thickness of 0.1 to 0.5 mm, the CFRP prepreg 11, which was made of a plurality of commercial prepregs piled up mutually and to have an adjusted thickness of 1 to 3 mm, was used in the present exemplary embodiment.

<Manufacturing Procedure>

A manufacturing procedure using the manufacturing apparatus of FIG. 1 is explained as follows.

The blank material 1 which is a target of hot-pressing (also called as die quenching (DQ)) is fed into the first heating chamber 4 in the heating housing 2 with a feeding device 3. In the first heating chamber 4, a horizontal conveyance path is provided with a plurality of conveyance rollers 5, and electricity or gas heating means (not illustrated here) is provided. The blank material 1 is conveyed from the left to the right of FIG. 1 on conveyance rollers 5, and is heated to a temperature range of 800 to 1050 degrees during this conveyance time (about 1 to 10 minutes). Thus, the blank material 1 is heated up to the temperature (range) at which quenching is possible by the first heating chamber 4.

The blank material (blank material 6 in a high temperature state) passed through the first heating chamber 4 is taken out onto a conveying device 7, and is carried to a pressing machine 8. The high temperature state blank material 6 is set onto a lower mold 9 of DQ forming dies, then is hot-pressed between the lower mold (die) 9 and the upper mold (die) 10 of DQ forming dies, and press-forming (shaping a hat shape containing a concave portion as shown in FIG. 3) and quenching are simultaneously performed onto it. Accordingly, a quenched metal base body 14 as a first intermediate product is obtained. As a result of the hot-pressing (die quenching), the tensile strength of the metal base substance 14 is raised to 1400 to 1800 MPa. In addition, in order to enhance the effect of quenching, it is preferred to provide a cooling channel in the inside of DQ forming dies (9, 10).

The temperature of the quenched metal base body 14 immediately after hot-pressing is about 100 to 250 degrees, and this temperature is almost equivalent to the thermal-curing temperature of the above-mentioned prepreg. The metal base body 14 taken out of DQ forming dies (9, 10) is set onto a lower mold (die) 12 of the CFRP forming dies, and a CFRP prepreg 11 is set thereon (see FIGS. 1 and 2). Then, an upper mold (die) 13 of CFRP forming dies is forced to press on the lower mold 12 by a press stroke synchronized with hot-pressing, and a CFRP prepreg 11 is formed to be met (i.e. complementary) with a shape of the metal base body 14 and is forced to stick on the metal base body 14 (see FIG. 3). In this way, a temporary sticking composite work 15 as a secondary intermediate product having the CFRP prepreg 11 in intimate contact with the surface of the metal base body 14 as the first intermediate product is obtained. In addition, since the CFRP forming dies (12, 13) are structurally similar with the holding molds for curing/adhering (16, 17) mentioned later, detailed structures of the CFRP forming dies (12, 13) and the holding molds for curing/adhering (16, 17) will be explained later as a whole.

The temporary sticking composite work 15 taken out of the pressing machine 8 is set onto the holding molds for curing/adhering (16, 17) which are cyclically movable in the second floor (stage) portion and the third floor (stage) portion of the heating housing 2 (see FIG. 1 and FIG. 4). Concretely, the temporary sticking composite work 15 is set onto the lower mold 16 of the holding molds for curing/adhering which is standing by on the first hold carrying device 19, and immediately after that, an upper mold 17 of the holding molds for curing/adhering is piled up by a device for elevating the upper mold 18. Then, the temporary sticking composite work 15 is sent into the second heating chamber 20 in a state of sandwiched and fitted between the upper and lower molds 16, 17 (see FIG. 5). In addition, a plurality of pairs of the lower mold 16 and the upper mold 17 of holding molds for curing/adhering are prepared for the manufacturing apparatus of the present exemplary embodiment (see FIG. 1).

As shown in FIG. 1 and FIG. 5, in the second heating chamber 20, the horizontal conveyance path with a plurality of conveyance rollers 21 is set up. The temporary sticking composite work 15 together with the holding molds (16, 17) is conveyed from the right to the left of FIG. 1 on the conveyance rollers 21 (i.e. roller conveyer), and is heated (warmed) up to the temperature (range) of 100 to 250 degrees and kept so during this conveyance time (about 1 to 10 minutes). In addition, no special heating device is provided in the second heating chamber 20, but as the heat for heating or warming the heating chamber 20 at 100 to 250 degrees use is made of the remaining heat (conductive heat and waste heat) transmitted from the downside first heating chamber 4. In addition, in the second heating chamber 20, an auxiliary (electric type or a gas type) heating device may be used for temperature control. Moreover, a plurality of press-fit rollers 22 opposing the conveyance rollers 21 are arranged and provided at the ceiling of the second heating chamber 20 (see FIG. 1 and FIG. 5), and the temporary sticking composite work 15 held within the holding molds for curing/adhering (16, 17) is conveyed in (through) the second heating chamber 20 with receiving a pressurization force by a group of press-fit rollers 22. In addition, a vertical position control is possible for a group of press-fit rollers 22 so that an interval (that is, pressurization force) relative to the conveyance rollers 21 can be changed (adjusted) depending on an object to be pressurized.

Both of the CFRP prepreg and the metal base body (11, 14) are bound firmly by thermal curing of the thermoset plastic effusion in the boundary region between the CFRP prepreg 11 and the metal base body 14 while the thermoset plastic contained in the CFRP prepreg 11 is thermally cured, because the temporary sticking composite work 15 passes through the second heating chamber 20 (that is, held for a predetermined period of time at the predetermined temperature, receiving a fixed pressurization force). Accordingly, a targeted metal/CFRP composite structure (finished product 25) is obtained.

In addition, in the present exemplary embodiment, since the heating time of the blank material 1 in the first heating chamber 4 is 1 to 10 minutes and the heating time of the temporary sticking composite work 15 in the second heating chamber 20 is also 1 to 10 minutes, the cycle time of the heating of the blank material 1 and the cycle time of the thermal curing bonding of temporary sticking composite work 15 are made the same by adjusting the conveyance speed with conveyance rollers 5 and 21 so that the passage time (staying time) of the first heating chamber 4 and the passage time of the second heating chamber 20 are synchronized, thereby ideal continuous production can be realized.

As shown in FIG. 1, the holding molds for curing/adhering (16, 17) passed through the second heating chamber 20 is taken out onto the second holding mold conveying device 23. Only the upper mold 17 of the holding molds for curing/adhering is raised by the device for elevating the upper mold 24, and the finished product 25 of the metal/CFRP composite structure is taken out. Then, the holding mold conveying device 23 goes up into the third floor portion (height of the third heating chamber 26), in a state where the lower mold 16 of the holding molds for curing/adhering is put on the device. And the upper mold 17 which is raised beforehand by the device for elevating the upper mold 24 is combined with the lower mold 16, and a united form of molds 16 and 17 is sent into the third heating chamber 26.

In the third heating chamber 26, the horizontal conveyance path with a plurality of conveyance rollers 27 is set up. The holding molds for curing/adhering (16, 17) are conveyed from the left to the right of FIG. 1 on the conveyance rollers 27, and arrive at a position of the first holding mold conveying device 19. A time required for passing the holding molds for curing/adhering (16, 17) through the third heating chamber 26 is set as same as the time for passing the temporary sticking composite work 15 through the second heating chamber 20 (that is, about 1 to 10 minutes). The holding molds for curing/adhering (16, 17) are heated or kept warm at 100 to 250 degrees during this conveyance time. In addition, no special heating device is provided in the third heating chamber 26, but as the heat for heating or warming the heating chamber 26 at 100 to 250 degrees use is made of the remaining heat (conductive heat and waste heat) transmitted from the downside first heating chamber 4 and second heating chamber 20. In addition, in the third heating chamber 26, an auxiliary (electric type or a gas type) heating device may be used for temperature control.

After preheating at 100 to 250 degrees, as to the holding molds for curing/adhering (16, 17) taken out onto the first holding mold conveying device 19, the upper mold 17 is raised by the device for elevating the upper mold 18, and is separated from the lower mold 16. Then, the holding mold conveying machine 19, in a state where only the lower mold 16 is put thereon, descends to the second floor portion (height of the second heating chamber 20). And again, a cyclic conveyance operation is repeated such that the temporary sticking composite work 15 is set on the holding mold conveying machine 19 and goes into the second heating chamber 20, passes through the third heating chamber 26 and returns to the position of the holding mold conveying device 19. Therefore, in the present exemplary embodiment, "the conveying mechanism for cyclically conveying a plurality of pair of holding molds for curing/adhering (16, 17) within the second and third heating chambers (20, 26)" is formed with devices 18 and 19, rollers 21 and 22, devices 23 and 24, and rollers 27.

<CFRP Forming Die and Holding Mold for Curing/Adhering>

Since the CFRP forming dies (12, 13) and the holding molds for curing/adhering (16, 17) have almost the same structure, explanations are given below collectively. In addition, FIG. 7 shows a full side view of the CFRP forming dies (12, 13) or the holding molds for curing/adhering (16, 17) where the temporary sticking composite work 15 is held, and FIG. 6 shows a plan view (top plan view) in a state where the upper mold (13, 17) is removed from the CFRP forming dies or holding molds for curing/adhering where the temporary sticking composite work 15 is held. FIG. 4 and FIG. 2 correspond to the sectional view along the A-A line of FIG. 6.

As shown in FIG. 2 and FIG. 4, the lower mold 12 of CFRP forming dies and the lower mold 16 of holding molds for curing/adhering have almost the same structure. As shown in FIG. 6 and FIG. 7, these lower molds (12, 16) have work supporting parts having a plurality of rows 30 (four rows are illustrated in FIG. 6) arranged at equal intervals on a lower mold base plate 28, and end blocks 29 are provided by standing at both sides of the work support part 30 of each row. Work supporting parts having a plurality of rows 30 are arranged by corresponding to a part of surface portion among whole surface of quenched metal base body 14 where the CFRP prepreg 11 is attached. While work supporting parts having a plurality of rows 30 exclusively support the only corresponding prepreg parts of the work, these parts cooperate together to provide a form (framework) for holding the lower side meeting (fitting) to a form of the metal base body 14 after forming (molding). For this reason, the remaining part of the metal base body 14 not sticking the CFRP prepreg 11 is substantially in a support-free (without support) state. These lower molds (12, 16) are provided with the bottom jigs 36 and 38 suitable for work supports for positioning and also fixing the metal base body 14.

As shown in FIG. 2 and FIG. 4, the upper mold (die) 13 of CFRP forming dies and the upper mold 17 of holding molds for curing/adhering have almost the same structure. As shown in FIG. 6 and FIG. 7, these upper molds (13, 17) provided with a press part 31 via a mount 32 below the upper mold base plate 33. This press part 31 is provided by corresponding to a part of surface portion among whole surface of quenched metal base body 14 where the CFRP prepreg 11 is attached. These upper molds (13, 17) are provided with the top jigs 37 and 39 for work supports for positioning and also fixing the metal base body 14 (see FIG. 7). As shown in FIG. 6 and FIG. 7, the metal base body 14 is fixed by putting shaft-orientations both ends of the metal base body 14 (in FIG. 6 and FIG. 7, depicted as a form in a case where B pillar of a car is assumed) as the work between lower jigs 36 and 38 and upper jigs 37 and 39.

According to the present exemplary embodiment, since there is an adhesive strength in thermoset plastic itself, such as an epoxy resin contained in the CFRP prepreg 11, the metal blank material 1 and the CFRP prepreg 11 can be firmly adhered by holding them into the holding molds for curing/adhering (16, 17), and applying heating (keeping warm) and pressurization thereto. Since a pressurization force required for forming and attaching of the CFRP prepreg 11 is 0.1 to 5 kgf/cm² (0.98 to 49.0N/cm²) and is relatively low pressure, a heat-resistant urethane or heat-resisting rubber is sufficient for a constituent material of the press part 31 of the upper molds (13, 17). A size setup of this press part 31 is greater by about a maximum of 5 mm than the aimed size of forming, and the CFRP prepreg 11 is forced onto the blank material 1 based on a deflection (elastic deformation) of the press part 31. Incidentally, a height of end blocks 29 may be adjusted or the press part 31 may be formed of soft metal materials, such as ZAS (a kind of a zinc alloy) and metallic mold materials, such as SKD so that the press strength of the press part 31 does not become large in excess.

The quenched metal base body 14 has high strength and also high-rigid form, and is not deformed by an external force such as the above-mentioned pressurization force applied by the press part 31. Therefore, even if the simple supporting structure arranging intermittently a plurality of rows of thin wall-shaped work supporting parts 30 in the lower molds (12, 16) is employed, any trouble does not arise at all in forming (molding) and holding the CFRP prepreg 11 because such structure can fully receive to resist the pressurization force.

Effect of the Exemplary Embodiment

Advantages, etc. of the present exemplary embodiment are explained, as follows.

In conventional technology (Patent Literatures 1 and 2), the forming of the aluminum base material, the forming of the fiber-reinforced plastic, and the bonding or adhering of the aluminum base material and the fiber-reinforced plastic after forming are mutually separate independent steps, and there was a drawback that the manufacturing cost was expensive because of a necessity of taking many steps. On the other hand, in the present exemplary embodiment, since the forming of the CFRP prepreg 11 and the adhering to the metal base body 14 can be continuously carried out using the apparatus as shown in FIG. 1 which is obtainable by slightly modifying the apparatus for hot-pressing of steel plate, the manufacturing cost can be reduced compared to the conventional cost.

In conventional technology (Patent Literature 2), probably, a special heating device might be needed, in order to secure a temperature required for curing the thermoset plastic material. On the other hand, in the present exemplary embodiment, since the remaining heat from the first heating chamber 4 securing the hot-press is used as a heat source of the second heating chamber 20 securing the thermal-curing adhering, an additional heating device is not needed for the second heating chamber 20 and the apparatus cost can be reduced. Moreover, since the remaining heat from the first heating chamber 4 is used, the thermal efficiency is excellent and the energy saving, that is, reduction of the manufacturing cost can be achieved.

The metal base body 14 immediately after the hot-pressing is cooled to the temperature level of 100 to 250 degrees, fortunately, the temperature at this time is the same level as the forming and curing temperature of the thermoset plastic. Thus, an amount of heat which the metal base body 14 after quenching keeps can be used effectively for forming and curing of thermoset resin; as a result, simplification of manufacturing, cost reduction, and energy saving can be attained.

According to the pressing device 8 of the present exemplary embodiment, since the hot-pressing of the blank material 6 in a high temperature state and the forming and superposition of the CFRP prepreg 11 can be carried out by the same pressing stroke, reduction of the apparatus cost and energy saving cost can be achieved.

In the present exemplary embodiment, since the form of the CFRP prepreg 11 is laid onto the metal base body 14, the structure of the mold (that is, lower mold 12) of the die-side of the CFRP forming mold (concave side) can be made simple, and a reduction of molding cost is possible.

In the present exemplary embodiment, since the form of the CFRP prepreg 11 is laid onto the metal base body 14, followed by holding its superposition state for a predetermined period of time in the state of heating and pressuring with holding molds (16, 17), an accurately integrated mold (product) can be formed in a state where the CFRP prepreg 11 meets (fits) intimately the metal base body 14. Moreover, in that case, the thermoset plastic impregnated in the CFRP prepreg 11 leaks out, so that participating in adhesion bonding, an additional applying adhesives anew is unnecessary, and a manufacturing efficiency is very excellent.

Generally, since the thermoset plastic needs a time for 1 minute or more for thermal curing, a cycle time will become long in case of thermal curing within CFRP forming dies (12, 13). On the other hand, in the present exemplary embodiment, aside from the CFRP forming dies (12, 13), since the holding molds of curing/adhering (16, 17) with simple and low cost are prepared in a plurality of pairs which are used in repeatedly cyclically, a cycle time in all the steps can be shortened considerably.

In the present exemplary embodiment, by installing the heating housing 2 into multi-stage structure, as shown in FIG. 1, a space passing on a plurality of pairs of holding molds of curing/adhering (16, 17) is securable, even within a limited space of the apparatus.

ALTERNATIVE EXAMPLE

In the manufacturing apparatus of FIG. 1, a preheating room 50 for preheating the CFRP prepreg 11 before setting to the CFRP forming dies (12, 13) may be provided as annex.

The entire disclosures of the above Patent Literatures are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

REFERENCE SIGNS LIST 1, 6: blank material
2: heating housing
4: first heating chamber
8: pressing machine
9, 10: die quench forming dies (hot-pressing means)
11: CFRP prepreg
12, 13: CFRP forming dies (CFRP forming means)
14: quenched metal base body (first intermediate product)
15: temporary sticking composite work (secondary intermediate product)
16, 17: holding molds of curing/adhering
20: second heating chamber
26: third heating chamber
18, 19, 21-24, 27: conveying mechanism for cyclically conveying holding molds for curing/adhering

The invention claimed is:

1. A manufacturing method of metal/CFRP composite structure, comprising:
heating, in a first chamber, a metal blank material to a temperature at which quenching is possible;
hot-pressing said blank material to obtain a hot-pressed first intermediate product which is quenched by the hot-pressing;
a preparation to prepare a carbon fiber reinforced plastic (CFRP) prepreg formed of carbon fiber and uncured thermoset plastic;
CFRP forming in which the CFRP prepreg is press-formed to obtain a secondary intermediate product having the CFRP prepreg in intimate contact with a surface of said first intermediate product by setting the hot-pressed first intermediate product and the CFRP prepreg into CFRP forming dies, followed by press-forming, with remaining heat in the hot-pressed first intermediate product being used in the CFRP forming; and
thermal curing bonding which bonds the CFRP prepreg and the first intermediate product firmly by thermal curing of the thermoset plastic located in a boundary of the CFRP prepreg and the first intermediate product by keeping warm and pressurizing the secondary intermediate product obtained by the CFRP forming for a period of time sufficient for thermally curing the thermoset plastic contained in the CFRP prepreg; and
wherein the remaining heat of the first chamber which is not transferred to the metal blank material in the heating before the hot-pressing is used in the keeping warm of the secondary intermediate product.

2. The manufacturing method of metal/CFRP composite structure defined in claim 1, wherein said metal is iron-based metal.

3. The manufacturing method of metal/CFRP composite structure defined in claim 2, wherein the forming (molding) of the CFRP prepreg is performed such that the CFRP prepreg is overlapped on the hot-pressed first intermediate product, and subsequently, the CFRP prepreg is formed to be complementary with the first intermediate product.

4. The manufacturing method of metal/CFRP composite structure defined in claim 1, wherein the forming (molding) of the CFRP prepreg is performed such that the CFRP prepreg is overlapped on the hot-pressed first intermediate product, and subsequently, the CFRP prepreg is pressed thereon using the formed and quenched metal blank as a kind of a lower mold.

5. The manufacturing method of metal/CFRP composite structure defined in claim 1, wherein the keeping warm and pressurizing the secondary intermediate product obtained by the CFRP forming for a period of time sufficient for thermally curing the thermoset plastic contained in the CFRP prepreg takes place in a second chamber directly above the first chamber.

6. A method of manufacturing a composite structure, comprising:
heating, in a first chamber, a metal blank material to a temperature permitting subsequent quenching to produce a heated metal blank material;
hot-pressing the heated metal blank material to obtain a hot-pressed first intermediate product which is quenched by the hot-pressing, the hot-pressed first intermediate product possessing an outer surface;
positioning the hot-pressed first intermediate product and a carbon fiber reinforced plastic prepreg in a forming die, the carbon fiber reinforced plastic prepreg that is placed in the forming die comprising carbon fiber and uncured thermoset plastic;
press-forming the hot-pressed first intermediate product and the carbon fiber reinforced plastic prepreg in the forming die to produce a secondary intermediate product in which the carbon fiber reinforced plastic prepreg is in intimate contact with the outer surface of the first intermediate product, with heat retained by the hot-pressed first intermediate product being used to form and cure the thermoset plastic;
positioning the secondary intermediate product in a mold; and
applying heat and pressure to the secondary intermediate product in the mold for a period of time sufficient for thermally curing the thermoset plastic contained in the carbon fiber reinforced plastic prepreg, the applied heat being the remaining heat of the first chamber which is not transferred to the metal blank material in the heating before the hot-pressing.

7. The method defined in claim 6, wherein the metal is an iron-based metal.

8. The method defined in claim 6, wherein:
the positioning of the hot-pressed first intermediate product and the carbon fiber reinforced plastic prepreg in the forming die includes overlapping the carbon fiber reinforced plastic prepreg on the hot-pressed first intermediate product; and
the press-forming of the hot-pressed first intermediate product and the carbon fiber reinforced plastic prepreg in the forming die includes pressing the carbon fiber reinforced plastic prepreg on the hot-pressed first intermediate product using the hot-pressed first intermediate product as a lower mold.

9. The method defined in claim 6, wherein the applying heat and pressure to the secondary intermediate product in the mold for a period of time sufficient for thermally curing the thermoset plastic contained in the carbon fiber reinforced plastic prepreg takes place in a second chamber directly above the first chamber.

* * * * *